Patented June 16, 1953

2,642,351

UNITED STATES PATENT OFFICE 2,642,351

CONTROL OF AQUATIC PLANTS

Arthur W. Swezey, Garden Grove, Calif., assignor to The Dow Chemical Company, Midland, Mich., a corporation of Delaware No Drawing. Application October 15, 1949, Serial No. 121,643

4 Claims. (Cl. 71—2.3)

This invention relates to herbicides and is particularly concerned with a composition and method for killing aquatic plants. The expression "aquatic plants" as herein employed refers to vegetative organisms normally growing in water and in which the leaf and stem parts are largely submerged. The expression is inclusive of alga such as Chara spp. (stonewort), a vegetative organism with stem-like and whorled leaf-like structures; water plants which have no roots such as Ceratophyllum demersum (coontail); and rooted aquatic weeds such as Anacharis densa (waterweed), Vallisneria americana (tape grass), and Potamogeton pectinatus (pondweed).

Aquatic plants growing out of place are commonly considered weeds, and millions of dollars are expended annually for their control. In irrigation ditches, canals, rivers and streams, these plants hinder the flow of water, cause excessive sedimentation, result in high water loss from evaporation, and interfere with navigation. In ponds and lakes, they frequently develop such a dense growth as materially to limit the usefulness of such bodies of water for either recreational or commercial purposes. Mechanical operations, such as dredging, chaining, burning and mowing have heretofore been the principal means of control. More recently efforts have been made at chemical control. The shortcomings of the latter methods have included the superficial burning of exposed leaves without the killing of roots so as to permit the quick regrowth of the plants, the poisoning of the water so as to make it unsuited for irrigation purposes, and specificity of action against certain species only, thus leading to increased growth activity on the part of unaffected plant growth. The desirability of an improved control measure appears evident.

According to the present invention, it has been discovered that the delta isomer of 1,2,3,4,5,6-hexachlorocyclohexane is very toxic to aquatic plants. When this compound or a composition in which it is employed is introduced into the water adjacent to the submersed portions of aquatic plants, a quick kill of the stems and leaves results, accompanied by the control in a short period of time of the roots where present. The preferred embodiments of the invention include (1) the method as outlined and (2) a water-dispersible liquid herbicide concentrate comprising the delta 1,2,3,4,5,6-hexachlorocyclohexane as a principal active toxic ingredient.

The advantages accruing to the new composition and to the application of the same for control of aquatic weeds are many. The rapidity of action is in striking contrast to many other herbicide products which frequently require up to several weeks or more to accomplish control of vegetation. Also, the versatility of action against aquatic growths is advantageous in that it permits the simultaneous control of many different kinds of plants whether narrow- or broadleaf, and of all plant parts including roots. In previous operations with known herbicidal materials against mixed stands of undesired vegetation, the killing of one type of plant frequently has encouraged the growth of unaffected plants so as to vitiate the initial results and necessitate multiple treatments with attendant inconvenience and expense. The matter of economy of operation is also of importance. The toxicant material here employed is relatively inexpensive, easy to handle, and effective at very low dosages. All of these features contribute to the usefulness and desirability of the present development. Also, the presence of very small amounts of delta hexachlorocyclohexane in the water and on dead plant residues does not present a problem with respect to subsequent utilization of the water in agricultural operations such as irrigation. The tolerance of all crop plants for water containing delta hexachlorocyclohexane has not been exactly determined, but it has been found, for example, that the diversion of the water from a treated irrigation ditch into the water of an untreated ditch generally accomplishes sufficient dilution that the water safely can be used on most desirable plant species.

A further advantage in the invention resides in the wide range of water temperatures over which the method is operable. Thus the treatment can be carried out at almost any water temperature which will permit the growth and development of aquatic plants to the point where they become a nuisance.

The compositions of the present invention are preferably liquid concentrates in which the delta 1,2,3,4,5,6 - hexachlorocyclohexane is associated with (1) a dispersing and emulsifying agent and (2) a mutual solvent for the toxicant and emulsifying agent. The balanced composition contains sufficient of the solvent to prevent the separation of toxicant and emulsifying agent in the concentrate, and sufficient emulsifying agent to make the composition self-dispersing in water to give a milky dispersion which thereafter breaks to permit the settling out of the solution of the delta hexachlorocyclohexane in the form of small water-immiscible droplets. Also, such composition should be characterized by a density only slightly greater than water.

The expression "dispersing and emulsifying agent" as herein employed refers to one or a combination of complex organic derivatives of the type identified as sulfonic acids, polyesters, polyethers, ether esters, ether alcohols, abietic acid-containing complexes, naphthenates, and certain salts of such compounds which have a relatively high solubility in organic liquids. Illustrative of materials which may be so employed are alkyl-aryl sulfonic acids, alkali metal rosinates, alkali metal naphthenates, sodium alkyl-aryl sulfonates, sorbitol long-chain fatty acid esters, polyalkylene derivatives of sorbitol long-chain fatty acid esters, polyalkylene oxides, and polyalkylene oxide derivatives of phenolic structures. These materials are as described in "Emulsion Technology," second edition, pages 329–346, published 1946 by Chemical Publishing Company, Brooklyn, New York. The proportion of such agent employed is not critical, provided only that the dispersing action be accomplished. Generally, from about 5 to 20 per cent by weight of the total composition is sufficient, depending upon the particular agent selected.

The expression "mutual solvent" is inclusive of such materials as cyclohexanone, benzene, xylene, isopropyl benzene, hexalin, cresylic acid, isopropyl naphthalene, toluene, various petroleum distillates, and the like. Here again, the proportion may vary widely provided the required solvent and carrier action be supplied. In practice, from about 50 to 90 per cent of such solvent has been found to give desirable results.

Other constituents adapted to be employed in the mixtures include the mono-, di-, and tri-chlorobenzenes, liquid chloronaphthalenes, and chlorinated alkylbenzenes. Here again, the limiting factors on the ultimate mixture include the indicated characteristics of density and dispersibility in water.

The proportion of delta hexachlorocyclohexane in the ultimate liquid concentrate composition may vary from about 3 to 40 per cent or higher and is largely determined by the solubilities of the various constituents in the composition.

The liquid compositions are readily prepared by mixing and warming the several constituents. The resulting concentrate should be a mobile liquid adapted to be sprayed or otherwise distributed in conventional apparatus. It has been found advantageous to mix such product with approximately an equal volume of water shortly before application. This permits improved distribution of the toxic ingredient, and facilitates dispersion of the ultimate mixture in the water.

An alternative mode of compounding includes the dispersion of the delta hexachlorocyclohexane in a finely divided carrier such as diatomaceous earth, pyrophyllite, clay, or fuller's earth to form a wettable powder. In such mixture, the delta hexachlorocyclohexane may constitute from 5 to 95 per cent by weight of the ultimate composition, and such wetting and dispersing agents, organic solvents, or supplementary toxicants may be included as may appear desirable. The production of such wettable powders is readily accomplished by simply grinding the materials together. Alternatively, the delta hexachlorocyclohexane and other constituents may be dissolved in a suitable organic solvent and the finely divided carrier wet with the solution. The solvent may or may not be recovered by evaporation as desired.

The method of the present invention contemplates the application of the described materials to any pond, lake, river, stream or ditch where submersed aquatic plants are a problem. However, the effective ingredient has been found sufficiently toxic to fish and other marine animal life that the preferred embodiment is the treatment of drainage and irrigation ditches where the conservation of fish life is not critical. In instances where it is desired not only to control vegetation but also to eliminate fish and other water life, as in the poisoning of trash fish to permit restocking, the treatment of lakes and ponds is strongly recommended. It should further be pointed out that the treatment has not proven completely satisfactory against water hyacinth, although at 500 parts of the toxicant per million parts of water a considerable control is obtained upon the leaves and stems of the plant, and the roots and bulblets exhibit some effect of treatment.

In general, the method of the present invention comprises the killing of aquatic plants by dispersing into the water adjacent to the submersed portions of the plants a lethal concentration of delta 1,2,3,4,5,6-hexachlorocyclohexane. Any suitable formulation of delta 1,2,3,4,5,6-hexachlorocyclohexane may be employed in ponds or lakes, with the water-dispersible liquid concentrates preferred in the treatment of streams, ditches or other moving water.

The application may be made at any suitable water temperature but preferably above 50° F. In ponds or other standing water, minimum operable concentrations range between about 25 and 200 parts of toxicant per million parts of water, depending upon plant species, plant mass, water temperature, exposure time, and other conditions of operation. In moving bodies of water, minimum concentrations should be from 50 to 2000 parts of toxicant per million parts of water, again depending upon operating conditions and plant species concerned. Preferred range of concentrations is from 100 to 500 parts per million. At exposure times of one-half hour and one hour, minimum concentrations of 500 and 250 parts per million, respectively, have been found to give good results.

In application, the object is to provide a relatively uniform dispersion of a lethal concentration of the toxicant in the water adjacent to the undesired plant growth and for an exposure time sufficient to cause the death of the vegetation. This is readily accomplished by spraying or dispersing the described concentrate compositions just under the surface of the water and directly above the plant mass so as to accomplish their dispersion and thereafter permitting the toxicant to settle onto the plant surfaces and into the stream or pond bottom about the plant roots. Application may also be made by spraying or sprinkling on the water surface. With the liquid compositions, application may be made with a pump and spray boom assemblage so that the ejected spray or stream of the composition is placed at a point below the surface of the water and just above the vegetation, the expulsion of the concentrate from the orifices of the boom being under such pressure as to accomplish the relatively uniform dispersion of the concentrate in the water. Alternatively, the composition may be sprayed over the surface of the water with sufficient force to accomplish dispersion of the concentrate to form a milky blanket which slowly settles through the water and onto the plant surfaces. With the wettable powders, the composition is dusted on the surface of the water with sufficient agitation to insure wetting and dispersion.

In streams, ditches, or other moving water, the feet of flow per second is a determining factor in the amounts employed and exact mechanics of application. Here, the toxic composition is introduced into the water preferably at some distance upstream from the vegetative growth, and a blanket of the diluted toxicant caused to flow into and over the area of plant growth for the necessary exposure time. In this embodiment of the invention, the milky coloration imparted to the water by dilution of the liquid concentrate is most advantageous. Thus, the concentrate may be flowed, dripped, sprayed, or otherwise metered into the stream of water and the progress and persistence of the toxicant determined by visual inspection. A convenient mode of operation includes introducing the concentrate by a knapsack sprayer below the surface and preferably to the lower level of the water. As the milky dispersion of toxicant moves down the stream its exact position can be observed and additional material introduced as desired. By observation of the intensity of the cloudy dispersion, the concentration of toxicant can be closely estimated. A convenient technique includes positioning a bright metal disc below the surface of the stream and adjacent to the vegetation under treatment. When the turbidity of the water attributable to the presence of dispersed delta hexachlorocyclohexane is low so as clearly to reveal the disc, additional concentrate may be employed.

Among the submersed aquatic weeds which may be controlled with the described composition and method are water stargrass (*Heteranthera dubia*), horned pondweed (*Zannichellia palustris*), and milfoil (*Myriophyllum spp.*).

The following examples illustrate the invention but are not to be construed as limiting:

EXAMPLE 1

20 parts by weight of the delta isomer of 1,2,3,4,5,6-hexachlorocyclohexane, 40 parts of allyl sulfonate polyalkylene derivative (Trex 80), and 340 parts of cyclohexanone were mixed together to produce a liquid water-dispersible herbicide concentrate comprising 5 per cent by weight of the hexachlorocyclohexane isomer. This composition was employed for the control of *Vallisneria spiralis* rooted in the sand bottoms of a series of small water tanks. Three replications were made. In these operations, the herbicide concentrate was poured into the water of each tank in such quantity as to give a concentration of 400 parts of the hexachlorocyclohexane per million parts of water. The concentrate spread quickly upon contact with the mass of water to give a milky dispersion which upon casual stirring became evenly distributed throughout the tank. The dispersion tended to settle very slowly to the bottom of the tank. The plant as treated was completely submersed in the water and was permitted to remain in contact with the dispersed concentrate for a period of one hour. At the end of this time, each tank was thoroughly flushed and filled with fresh water. 4 days after treatment, the vegetative growth was examined and an apparent 100 per cent top-kill observed. After 42 days, the tanks were drained and the entire plants lifted from the sand for examination. There was no apparent regrowth and the entire plant appeared dead and sere with leaf, stem and root tissue well on the way to bacterial decomposition.

Check observations were carried out simultaneously in untreated tanks. Here the plants flourished without any indication of die-back or injury. During all of the determinations, the water temperatures ranged from 53° to 98° F. but mostly from 70° to 73° F.

EXAMPLE 2

Similar determinations were carried out in which growing beds of *Vallisneria spiralis* were subjected to treatment with the composition described in Example 1 in such proportion as to provide a concentration of 250 parts per million of the hexachlorocyclohexane in the water of the tanks. Again, the plants were exposed to the action of the herbicide for one hour, and the tanks thereafter flushed and refilled with fresh water. The water temperature during the week following treatment ranged from 70° to 73° F. The plants were examined after 42 days and a 100 per cent kill of both tops and roots was observed. In check determinations, the wetting agent and cyclohexanone were employed at the same concentration. A 12.5 per cent die-back of leaves followed by regrowth was observed. The roots were unaffected.

EXAMPLE 3

In a further series of treatments, tanks containing *Anacharis densa* were treated with the composition of Example 1 in the manner previously described and in such proportion as to give a concentration of 400 parts of the delta hexachlorocyclohexane per million parts of water in the several tanks. After an exposure time of one hour, the tanks were drained, flushed, and refilled with fresh water. Again 100 per cent kill of all leaf, stem and roots was obtained.

EXAMPLE 4

25 parts by weight of the delta isomer of 1,2,3,4,5,6-hexachlorocyclohexane, 10 parts of alkylated aryl polyether alcohol (Triton X–100), and 65 parts of xylene were mixed together to produce a homogeneous concentrate composition. This mixture was employed as described in Example 1 for the control of *Vallisneria americana* growing in the sand bottom of fresh water tanks. Five replications of each determination were made. The concentrations, exposure times and results obtained are set forth in the following table.

Table I

| Delta Hexachlorocyclohexane in parts/million | Exposure Time, Hours | 7 Days, Percent Top Kill | 20 Days, Percent Top Kill | 32 Days | |
|---|---|---|---|---|---|
| | | | | Percent Top Kill | Percent Root Kill |
| 150 | 1 | 100 | 100 | 100 | 65.0 |
| 200 | 1 | 100 | 100 | 100 | 62.25 |
| 250 | 1 | 100 | 100 | 100 | 65.00 |
| 300 | 1 | 100 | 100 | 100 | 72.5 |
| 400 | ½ | 100 | 100 | 100 | 62.5 |
| 500 | ½ | 100 | 100 | 100 | 70.0 |
| 500 (xylene and wetting agent only) | ½ | 50 | 25 | 0 | 0 |
| Check | | 0 | 0 | 0 | 0 |

Where the xylene alone was employed, a temporary browning of the leaf and stem growth was observed. This was followed by regrowth at such a rate that by the end of the observation period it was difficult to distinguish the treated plants from the untreated checks. The water temperature during the period of observations varied from about 69° to 78° F.

EXAMPLE 5

A further determination in which the composition of Example 4 was employed for control of the tape grass (*Vallisneria americana*), employed lower concentrations of the hexachlorocyclohexane delta isomer. At one hour exposure time, concentrations of 50, 100 and 150 parts per million gave percentage top kills of 90.6, 100 and 100 and root kills of 52.5, 62.5 and 62.5 respectively in 15 days.

EXAMPLE 6

The operations of the preceding examples were carried out using the composition of Example 5 for the control of coontail (*Ceratophyllum demersum*), a free-floating plant with no roots. The following table sets forth the results obtained on 1 hour exposure:

*Table II*

| Parts/Million of Delta Hexachlorocyclohexane | Percent Kill in 2 Days | Percent Kill in 8 Days |
| --- | --- | --- |
| 50 | 37.5 | 87.5 |
| 100 | 33.5 | 95.8 |
| 150 | 41.5 | 95.8 |
| 200 | 45.0 | 100 |
| 0 | 0 | 0 |

The plants in the treated tanks quickly browned and at the end of the observation period appeared to be undergoing rapid bacterial decomposition. When mildly agitated, the vegetative sprays of the plant shattered and disintegrated. The average noontime temperature of the water was 75° F. during the period of observation.

EXAMPLE 7

The composition of Example 5 was similarly employed for control of Sago pondweed (*Potamogeton pectinatus*), a rooted submersed aquatic forming corms on its roots. The details of operation were substantially those described in Example 1, with an exposure period of 1 hour. The following results were obtained:

*Table III*

| Parts/Million of Delta Hexachlorocyclohexane | 1 Week, Percent Top Kill | 2 Weeks, Percent Top Kill | 4 Weeks Percent Top Kill | 4 Weeks Percent Root Kill | Number of Corms |
| --- | --- | --- | --- | --- | --- |
| 100 | 58 | 94 | 87 | 81 | 31 |
| 200 | 79 | 100 | 100 | 83 | 24 |
| 300 | 83 | 100 | 100 | 81 | 49 |
| 0 | 0 | 0 | 0 | 0 | 134 |

The figure on corms was determined by counting of the storage organs on the roots of twelve representative plants.

EXAMPLE 8

40 parts by weight of the delta isomer of 1,2,3,4,5,6-hexachlorocyclohexane, 1 part of alkylated aryl polyether alcohol (Triton X-100), and 59 parts of finely divided clay were mixed and blended together to produce a wettable powder. This composition was dispersed in the water of tanks containing a vigorous growth of coontail, the amount employed being such as to give a concentration of 400 parts per million of the active toxicant per million parts of water. Four replications were made, with water temperature running between 66° and 72° F. The exposure time was 1 hour, followed by flushing of the tanks. A quick browning of the growing tips of the weeds occurred, although the action of the wettable powder was somewhat slower than was the case where water-dispersible emulsions were employed. After about 15 days, the plants were found to have been killed.

EXAMPLE 9

The composition disclosed in Example 4 was employed in the treatment of a fish-rearing pond completely choked with Sago pondweed. The pond was 10 by 20 feet in outer dimension and 10 inches deep. The pond contained many snails and leeches and a few goldfish. The water temperature was 72° F. at time of treatment.

The liquid herbicide concentrate was sprayed over the surface of the pond with a knapsack sprayer and in such amount as to give a dosage of 100 parts of the delta 1,2,3,4,5,6-hexachlorocyclohexane per 1 million parts of water. The composition quickly dispersed over the surface of the pond, and as the emulsion began to break, settled like a blanket through the water. At the end of 4 hours the emulsion appeared to be completely broken and for the most part to have settled to the bottom.

One hour after treatment all the plant tops, as viewed from above, had turned brown. At the end of 4 days there was 100 per cent kill of tops and better than 60 per cent kill of runners and roots (as determined by the lifting of a number of plants from the pond bottom). At 7 days, all vegetation appeared to have been destroyed, and to be undergoing bacterial decomposition. The pond was then flushed thoroughly.

In addition to the vegetation control, all snails and leeches were killed by the treatment. Also, the scattered fingerling goldfish were killed.

The pond was observed over a considerable period of time following treatment and a series of flushing operations. The weed and vegetative growth quickly rotted down without any indication of regrowth. A number of flushings and a standing period of several weeks were required before the pond bottom was sufficiently detoxified to permit a return to fish-rearing.

EXAMPLE 10

An irrigation ditch one-half mile long, heavily grown up with Sago pondweed, *Potamogeton pectinatus*, is treated with delta isomer of 1,2,3,4,5,6-hexachlorocyclohexane in the water-dispersible form described in Example 4, in order to restore the ditch to its full water carrying capacity. The ditch is characterized by a 15 cubic foot per second flow and a stream velocity of 10 feet per minute to give an actual flow of 675 gallons per minute. The herbicide is applied directly to the surface of the water through the orifices of small nozzles attached to a boom connected through a hose to a small power spray rig consisting of a gear pump and gasoline engine. The herbicide is introduced into the ditch at a treating point 300 feet upstream from the congested area and at a rate to give a concentration of 500 parts of the toxicant per million of water for one hour exposure time over the weedy section. At a point downstream where the milky blanket of the emulsion has been lessened in concentration, more herbicide is added to bring the toxicant up to its original strength. The desirability of such addition is determined by lowering a metal disc into the water and comparing its visibility to a check area of known toxicant concentration. The treated water of the ditch is disposed of by dilution into a larger ditch before being used for irrigation. Within a few days, the pondweed becomes brown in color, starts to disintegrate and settles to the ditch bottom.

EXAMPLE 11

Tomato, radish, cauliflower, cabbage, sweet Spanish onion, parsnips, spinach, kidney bean, squash, pea, pepper, carrot, sugar beet, milo, Punjab flax and sweet corn seeds were planted in well fitted and drained seed beds. When the seedlings were seven weeks old, furrows were made immediately adjacent to the seed rows and the plant stands irrigated with water containing the delta isomer of 1,2,3,4,5,6-hexachlorocyclohexane at a concentration of 250 parts per million. The hexachlorocyclohexane was supplied as a water-dispersible liquid concentrate as described in Example 4. Three weeks following irrigation, the plantings were inspected and found not to have been injured by the treatment.

I claim:

1. A method for controlling aquatic plants which includes the step of introducing into the water adjacent to the submersed portions of the plants a water-dispersible concentrate comprising as a toxic ingredient the delta isomer of 1,2,3,4,5,6-hexachlorocyclohexane.

2. A method for killing the roots, rhizomes, and other submersed parts of aquatic plants which includes the step of introducing into the water adjacent to the plant a water-dispersible herbicide comprising as a toxic ingredient the delta isomer of 1,2,3,4,5,6-hexachlorocyclohexane, the proportion of toxicant in the concentrate and the dosage employed being such as to provide a lethal concentration of the hexachlorocyclohexane in contact with the plant surfaces.

3. A method for killing the submersed portions of aquatic plants which includes the step of dispersing into the water adjacent the plants a lethal concentration of the delta isomer of 1,2,3,4,5,6-hexachlorocyclohexane.

4. A method for killing aquatic plants which comprises dispersing in the water adjacent to the plants a minimum of 100 parts per million of the delta isomer of 1,2,3,4,5,6-hexachlorocyclohexane, and maintaining the submersed portions of the plant in contact with the dispersed hexachlorocyclohexane for a sufficient period to permit the action of the toxicant on the plant.

ARTHUR W. SWEZEY.

References Cited in the file of this patent

UNITED STATES PATENTS

| Number | Name | Date |
|---|---|---|
| 1,996,353 | Seydel | Apr. 2, 1935 |
| 2,110,842 | Ressler | Mar. 8, 1938 |

FOREIGN PATENTS

| Number | Country | Date |
|---|---|---|
| 573,712 | Great Britain | Dec. 3, 1945 |
| 576,493 | Great Britain | Apr. 5, 1946 |
| 740,232 | France | Jan. 23, 1933 |

OTHER REFERENCES

Agricultural Chemicals, August 1949, pp. 35, 75, 77.

Manufacturing Chemist, February 1946, page 70.

Water Works and Sewerage, July 1938, pp. 688 to 690.

Water Works and Sewerage, May 1940, page 231.

Specimen label in file of "Benochlor" trademark, No. 363,600, registered January 3, 1939.